United States Patent [19]

Lee

[11] 4,382,679
[45] May 10, 1983

[54] DYE LEAK DETECTION METHOD

[75] Inventor: Charles E. Lee, Castro Valley, Calif.

[73] Assignee: Cutter Laboratories, Inc., Berkeley, Calif.

[21] Appl. No.: 193,987

[22] Filed: Oct. 6, 1980

[51] Int. Cl.³ .............................................. G01N 21/90
[52] U.S. Cl. .................................... 356/237; 73/45.5; 250/459.1
[58] Field of Search ........................ 356/237, 239, 240; 250/458, 459, 461 R, 223 B; 73/40.7, 41.2, 45.5, 49.3

[56] References Cited
U.S. PATENT DOCUMENTS 2,472,522 6/1949 deForest ........................... 73/49.3 X
2,479,743 8/1949 Hall et al. .............................. 73/45.5
4,300,689 11/1981 Franklin et al. ................. 250/223 B

FOREIGN PATENT DOCUMENTS 1326255 8/1973 United Kingdom ................ 356/237
165331 10/1964 U.S.S.R. .............................. 73/49.3

Primary Examiner—Vincent P. McGraw
Attorney, Agent, or Firm—Robert E. Allen

[57] ABSTRACT

An improved method for testing the integrity of containers and closures for same is disclosed which is simple, easy to perform, and possesses a high degree of sensitivity. The method comprises immersing a container (whose walls are substantially transparent and in which a substantially transparent liquid is stored) into a solution of a dye under conditions which will favor the passage of the dye through any leaks present in the container or closure and into the liquid. The container is then placed in the path of a laser beam emitting a wavelength which approximates the fluorescent excitation frequency of the dye. If the color of the beam transmitted through the liquid is that which is characteristic for the fluorescing dye, a leak in the system is indicated.

9 Claims, 1 Drawing Figure

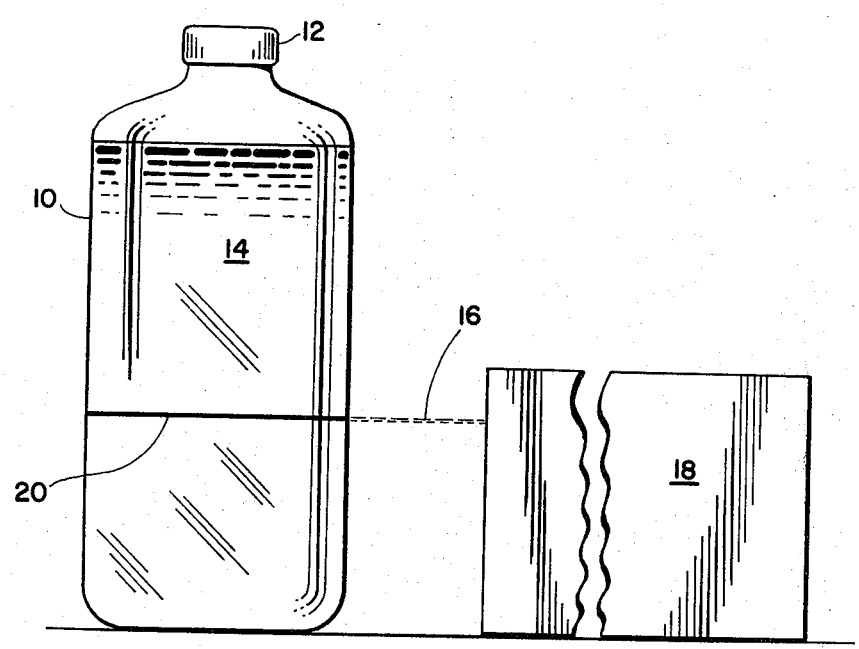
FIG. I

DYE LEAK DETECTION METHOD

BACKGROUND OF THE INVENTION

This invention relates to a method for testing the integrity of a container used for storing solutions, particularly containers in the medical area having parenteral, irrigation solutions or the like stored therein.

PRIOR ART

Parenteral solutions, irrigation solutions, additive solutions, and the like which are used in the medical arts are stored in glass or plastic containers, most of which have closures of one kind or another through which these solutions are ultimately dispensed. It is a strict requirement that the closures be hermetically sealed or the container walls themselves be intact so as to maintain the potency, purity and sterility of the solutions in the containers after manufacture.

In order to test a given container and/or closure system for its integrity and lack of leaks following the usual fill, seal, and heat sterilization procedures, a variety of integrity testing methods can be employed. These include pressure testing, i.e., the neck portion of the container may be severed and air applied under pressure to the neck while submerging the closure under water to detect any air bubbles from a leak at the closure. In a microbiological leak testing procedure, a container filled with a solution of growth media is sterilized, and then immersed in a bath containing viable microorganisms for a period of time. The contents of the container are then incubated and the presence of the microorganism noted in the incubated sample. Dye intrusion testing is also frequently used. In this procedure, the container is immersed in a solution of a dye, for example, methylene blue, then thoroughly rinsed to remove any dye on the outside surfaces, and the contents visually inspected for the presence of a blue coloration which would indicate a significant leak in the system. These procedures all are difficult, time-consuming and expensive to perform and the limit of detection in the case of the dye intrusion test may not be sufficiently sensitive. For example, as reported by D. E. McVean et al. (J. Pharm. Sciences, Vol. 61, No. 10, p. 1609, 1972), $10^{-5}$ ml. of a 1 percent methylene blue solution is about the lowest concentration of that dye which is visually detectable in 1 ml. of water, or 10 $\mu$l. per liter. I have observed that for a one percent solution of eosin Y (2', 4', 5', 7'-tetrabromofluorescein disodium salt), the detectable limit is about 1 $\mu$l/l. Leaks in containers, in which the amount of dye which has intruded is only slightly below these concentrations, would go undetected.

SUMMARY OF THE INVENTION

The improved dye intrusion method of the present invention for detecting leaks in a closed container comprises immersing a container, having substantially transparent walls and containing a substantially transparent liquid, into a solution of a fluorescent dye under conditions which will allow the dye to pass through any leaks in the container and into the liquid. The container is then placed in the path of a laser beam, the wavelength being selected which will induce substantially maximum fluorescence of the dye, and the absence or presence of the particular color of the light beam transmitted through the liquid which characterizes the fluorescing dye is noted. If the characterizing color is present, then the existence of a leak is confirmed. The absence of the characteristic color indicates the container to be free of leaks. The method is extremely rapid and easy to perform.

A laser provides a distinct advantage over other light emitting devices for inducing fluorescence in a dye since it produces high intensity light at an appropriate wavelength whose spectral purity provides increased sensitivity and permits greater specificity. As a result of the coherence of a laser beam, direct examination is possible of bottles and vials whose walls would normally scatter a light beam from conventional light beam sources. A laser beam will pass through the walls of a container with little diminution or divergence. To avoid the interference of any scattered light from the transmitted beam, it is suggested that laser safety goggles with sharp cut-off filters be worn while viewing the beam passing through the solution in a container. This helps to increase the sensitivity. Visualization of the transmitted laser beam is done in a darkened room.

The choice of laser is not critical and may be any commercially available laser, such as gas, dye, or solid state laser. Any dye can be used which will fluoresce when exposed to the light emitted by the laser. The dye should be soluble in water to the extent of at least about 0.001 percent and preferably about 0.1 to about 1 percent. When plastic containers are being tested, the dye chosen should be one which will not penetrate through the walls of either the container or the closure on the container. In the case of containers or closures made of polypropylene or copolymers of ethylene and propylene, for example, eosin Y is a preferred dye.

To achieve maximum sensitivity in the method, once an appropriate dye has been selected, a laser source is then chosen which is tuned, or may be tuned, to provide a wavelength of a convenient intensity which will induce substantially maximum fluorescence in the dye. A preferred combination is an argon ion laser, such as a Spectra Physics Model 164 argon laser, 514.5 nm, in conjunction with eosin Y dye. A typical power setting is 0.2 watt.

Container samples are immersed in a selected dye solution and may be subjected to a processing cycle which simulates extreme processing conditions. Considerable overstressing conditions may sometimes be employed to provide a safety factor over and above normal production conditions. These stresses may include pressure, vacuum, autoclaving, pasteurization or freezing in a cryogenic dye bath. Sample containers are uniformly rinsed prior to leak evaluation. In the case of plastic containers, the dye may be absorbed onto the outer surface and is not removed by rinsing. However, this has no effect on the laser beam in the detection of leaks. The method has a further advantage in that several aligned containers can be inspected simultaneously. In addition, containers holding solutions of macromolecules as for example, Plasma Protein Fraction or albumin, can be successfully examined by the method of this invention without the interference of the Tyndall effect which would be encountered with such solutions if light beams from ordinary (non-coherent) light sources were used. The method is also useful even though the solution in the container or the container wall itself is not perfectly clear or colorless.

The invention may be better understood by the detailed description which follows.

DETAILED DESCRIPTION OF A PREFERRED EMBODIMENT

The following serves to illustrate the very high degree of sensitivity in the method of the present invention by the use of eosin Y dye in combination with an argon laser.

LIMIT OF DETECTION

A. In Beakers

A one percent solution of eosin Y dye was prepared and diluted with distilled water so as to provide one liter quantities having four different concentrations. The solutions were placed in rigorously cleaned 500 ml. beakers and examined individually in a dark room when positioned approximately a foot from the light port of an argon gas laser emitting at a frequency of 514.5 nm and a power of 0.2 watt. The excitation frequency of a 0.001 percent solution of eosin Y had previously been determined to be 518 nm.

| Beaker No. | Dye Concentration $\mu l$ of 1% dye |
|---|---|
| 5 | 0.010 |
| 9 | 0.005 |
| 3 | 0.001 |
| 2 | 0.0005 |
| 13 | No dye |

Seven individuals chosen at random, having no previous experience with the procedure, were asked to examine the beam of yellow light passing through each beaker of solution (while wearing yellow filter goggles) and to list the numbers of the beaker in the order of decreasing intensity of light. All seven listed the numbers correctly in the sequence of 5, 9, 3, 2 and 13. They all expressed assurance that the intensity of the light beam passing through the solution having a concentration of 0.001 $\mu l$ of 1% dye per liter was quite strong and readily detectable. The beam of light passing through the blank (no dye) appeared as a faint red beam due to the Raman emission of water. Thus the sensitivity level for detection of eosin Y by this method is at least a thousand fold greater over the detection of the dye in ordinary light.

B. In Glass Bottles Containing Various Medicaments

The limit of detection of eosin Y by an argon laser was investigated on glass bottles containing a variety of medicaments.
1. 0.9% Saline in a 500 ml. bottle.
2. 5% Dextrose in a 500 ml. bottle.
3. 5% Dextrose-5% Ethanol in a liter bottle.
4. 8% Amino Acid Solution in a 500 ml. bottle. This solution is a pale, straw-colored solution.
5. Plasmanate ® Plasma Protein Fraction in a 250 ml. bottle. This is a 5% solution of predominately albumin and smaller amounts of $\alpha$ and $\beta$ -globulins. The solution is pale yellow.
6. Distilled water in a 500 ml. bottle.

A one percent solution of eosin Y dye was diluted with distilled water so as to give a standard solution containing 0.1 $\mu l$. of 1% dye/ml. Using a microsyringe, appropriate microliter quantities were injected through the stoppered bottles so as to give the concentration of 1% dye in the above-indicated volume of product. The bottles were then examined as described in part A.

TABLE I

| Product | Concentration of 1% dye in $\mu l$. | Positive Detection |
|---|---|---|
| 1 | 0.01 | Yes |
|   | 0.001 | Yes |
| 2 | 0.01 | Yes |
|   | 0.001 | No |
| 3 | 0.02 | Yes |
|   | 0.01 | No |
|   | 0.001 | No |
| 4 | 0.02 | Yes |
|   | 0.01 | No |
| 5 | 0.15 | Yes |
|   | 0.10 | No |
|   | 0.05 | No |
| 6 | 0.01 | Yes |
|   | 0.005 | Yes |
|   | 0.001 | Yes |
|   | 0.0005 | No |

Even though the sensitivity level falls off when the containers with yellow colored solutions were examined, as a consequence of background fluorescence caused by the product in the solution (Products 4 and 5), the degree of sensitivity is still sufficiently great to make the method very useful for testing integrity of containers in which such products are stored.

C. In Plastic Containers

Substantially square-shaped plastic containers made of biaxially-oriented polypropylene were used in this study. Since it had previously been observed that the outside walls became stained by eosin Y dye, a number of closed liter sized containers containing distilled water were first placed in a bath of 1 percent eosin Y, care being taken not to expose the closure to the dye. After heating in this bath at autoclave temperatures for a period of time, the containers were opened and thoroughly rinsed inside and out with hot distilled water. The water which was originally in the containers during the dye bath treatment was shown to be free of the dye when examined by the argon laser.

The rinsed containers whose outside walls were stained pink were then filled with known concentrations of eosin Y dye and examined by the argon laser as described in part A above.

TABLE II

| Concentration of 1% dye in $\mu l$. | Positive Detection |
|---|---|
| 0.0005 | No |
| 0.001 | No |
| 0.002 | No |
| 0.005 | Yes |
| 0.01 | Yes |

LEAK DETECTION PROCEDURE

A dye bath is prepared by dissolving in the proportion 10 g. eosin Y dye for every liter of distilled water. Preferably a surfactant such as 5 grams of sodium lauryl sulfate per liter of dye solution is also included which aids in the penetration of the dye through any leaks in a container.

Samples of filled and sealed containers are placed upright in a stainless steel tank and covered by about 3 cm. above the tops of the containers with the 1 percent eosin dye solution. The tank is covered with a stainless steel cover and autoclaved at temperatures, pressures and dwell times which simulate commercial production conditions. The tank and contents are cooled to about room temperature and the dye is pumped into a reservoir for possible reuse. The containers are rinsed thoroughly with tap water and dried.

As shown in FIG. 1, each container 10, which may have a suitable closure 12, and containing a medical solution 14, is positioned before a beam 16 being emitted from an argon laser 18 in a dark room. The laser beam emitted has an excitation frequency of 514.5 nm and the power of the instrument is set at 0.2 watt. When viewed through glasses having the appropriate cutoff filters necessary to remove stray light of the excitation frequency, the beam of light 20 passing through the container will appear yellow if dye is present in solution 14, indicating the presence of a leak either in the container or the closure. If beam 20 appears faintly red, no dye is present and the container and/or closure are judged to be free of leaks.

Having thus described the invention, I claim:

1. A method for detection of leaks in a closed container having substantially transparent walls and filled with a substantially transparent liquid comprising:
    (a) immersing the container in a solution of a fluorescent dye for a time sufficient for penetration of the dye through any leaks in the container into the liquid,
    (b) providing a path of a laser light beam, the wavelength of the beam being selected to induce substantially maximum fluorescence of the dye,
    (c) placing said container in said path of said light beam so that said light beam passes through said container without substantial scattering; and
    (d) visually observing within the container the presence or absence of a fluorescent light beam produced by excitation of said dye by said laser light.

2. The method of claim 1 wherein the container is a glass container.

3. The method of claim 1 wherein the container is made of a plastic which is impervious to the dye.

4. The method of claim 1 wherein the dye solution is at least about a one percent solution of eosin Y and the laser beam is produced from an argon ion laser tuned to 514.5 nanometers.

5. The method of claim 1 wherein in step (a) the submerged container is subjected to an overstressed condition.

6. The method of claim 1 or 5 wherein the observed color in step (d) is compared with the color of the laser beam passing through a liquid in a control sample.

7. The method of claim 6 wherein the control sample includes a blank, a positive control or a dye detection limit sample.

8. The method of claim 1 wherein said visually observing takes place in a darkened room through a filter preferentially transmitting said fluorescent light.

9. A method of dye leak detection comprising the steps of:
    (a) selecting a fluorescing dye known to visibly fluoresce brightly at a first wavelength when stimulated by light of a second, excitation wavelength;
    (b) immersing an essentially transparent container containing an essentially transparent liquid in a dye bath containing said fluorescing dye under conditions which will cause dye to leak into said liquid in the event of a leaky container;
    (c) providing a laser light beam at a preselected frequency matching said excitation wavelength;
    (d) passing said beam through a previously immersed container in a first direction; and
    (e) visually observing from a second direction, through a filter passing substantially only said first wavelength, the presence or absence of fluorescence in said beam within said container, said fluorescence being visually distinct in dye containing containers from said beam in dye-free containers so as to provide detection of dye in concentrations down to 0.001 microliter of dye per liter of said liquid.

* * * * *